United States Patent
Rose

[19]

[11] Patent Number: 5,914,687
[45] Date of Patent: Jun. 22, 1999

[54] COMBINED PHASE-CIRCLE AND MULTIPLATFORM TDOA PRECISION EMITTER LOCATION

[75] Inventor: Conrad M. Rose, Dahlgren, Va.

[73] Assignee: Litton Systems, Inc., Woodland Hills, Calif.

[21] Appl. No.: 09/088,258

[22] Filed: Jun. 1, 1998

[51] Int. Cl.[6] .................................................. G01S 5/04
[52] U.S. Cl. ........................................ 342/442; 342/424
[58] Field of Search .................................... 342/156, 417, 342/424, 442, 450

[56] References Cited

U.S. PATENT DOCUMENTS

| | | | |
|---|---|---|---|
| 5,343,212 | 8/1994 | Rose et al. | 342/424 |
| 5,526,001 | 6/1996 | Rose et al. | 342/442 |
| 5,592,181 | 1/1997 | Cai et al. | 342/457 |
| 5,596,330 | 1/1997 | Yokev et al. | 342/387 |

*Primary Examiner*—Thomas Tarcza
*Assistant Examiner*—Dao L. Phan
*Attorney, Agent, or Firm*—Scott J. Coonan, Esquire

[57] ABSTRACT

A method for determining the geolocation—i.e., the latitude, longitude, and altitude—of a stationary emitter emitting an RF signal. The method employs at least one moving observer to measure electrical phase change of the emitter over two or more successive dwell intervals, and at least two observers, moving or stationary and of known position, to determine the pulse time of arrival of the emitter signal. The phase change measurements are taken using a long baseline interferometer (LBI), and the pulse time of arrival measurements are calculated using short baseline interferometers (SBI). Circles of position are generated from bearing change measurements ascertained from the LBI phase change measurements, and hyperbolic lines of position are generated based on the SBI measurements. The position of the emitter is then determined from the intersection of the circles and lines of position.

17 Claims, 8 Drawing Sheets

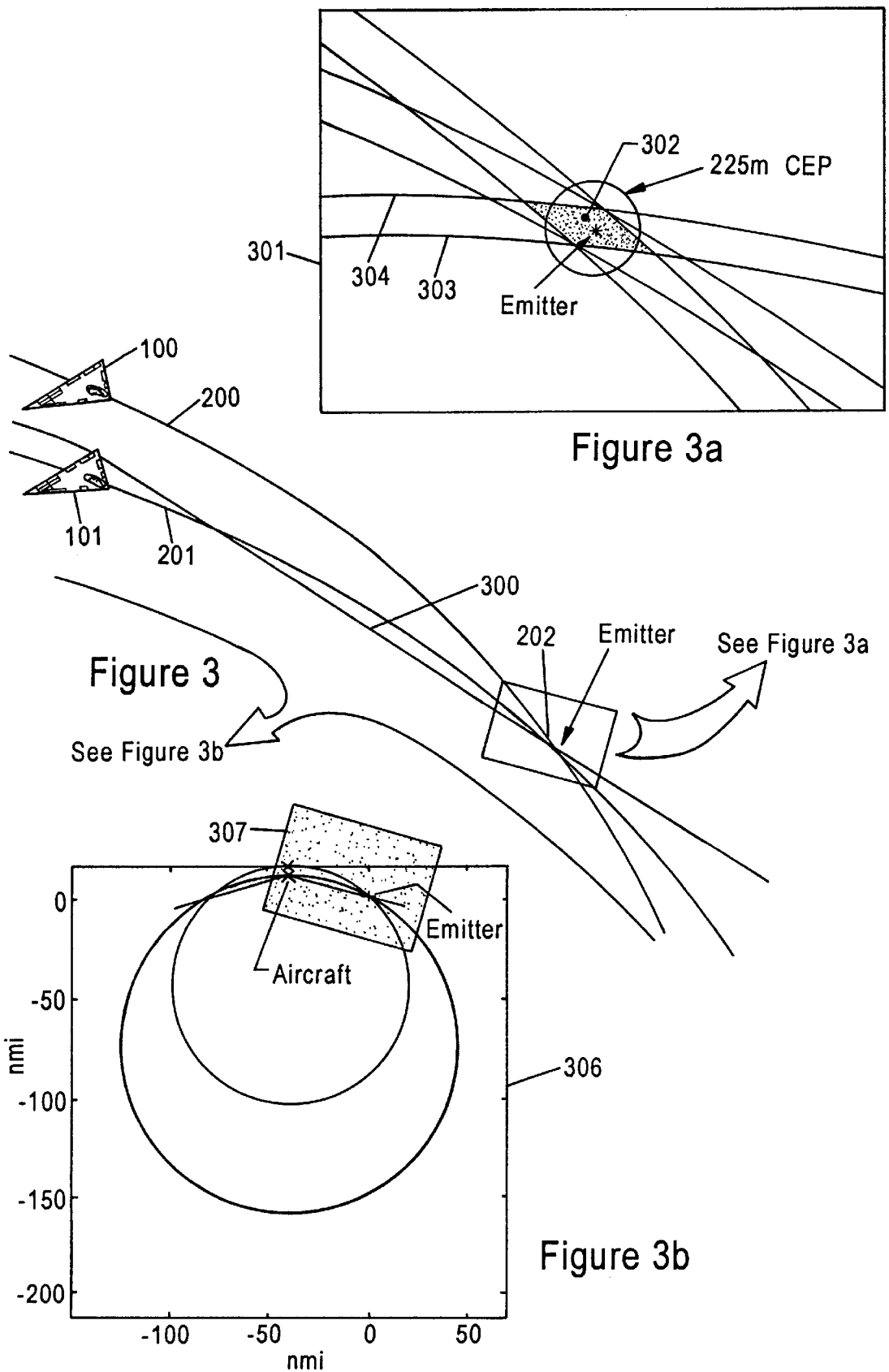

COMBINED PHASE-CIRCLE AND MULTIPLATFORM TDOA PRECISION EMITTER LOCATION

BACKGROUND OF THE INVENTION

A. Field of the Invention

This invention uses multiple observers to passively determine range and bearing to an RF emitter. In particular, it employs emitter wavefront phase change measured over at least two receiver dwells at a single aircraft and pulse time of arrival measurements made between two platforms to perform the geolocation—i.e., the determination of the emitter's latitude, longitude, and altitude. The only observer required to be moving is the aircraft making the phase change measurements.

B. Description of Related Art

Two methods to locate an RF emitter by generating lines-of-position (LOP) on which the emitter must lie are (1) to utilize time-difference of arrival (TDOA) hyperbola, with the TDOA measured between observers, or (2) to associate bearing differences with unique circles as curves passing through both the observer and the emitter. Multiplatform location techniques based on TDOA were thoroughly analyzed by Wegner in "On the Accuracy Analysis of Airborne Techniques for Passively Locating Electromagnetic Emitters" (RAND Report R-722-PR, 1971).

The association of circular lines-of-position with horizontal bearing difference measurements is a technique well known in navigation (see, for example, G. P. Clark, "Simplified Determination of the Ellipse of Uncertainty," *Navigation. Journal of the Institute of Navigation*, vol. 21, No. 4, 1974). Royal, in U.S. Pat. No. 3,922,533, describes its use in multiplatform RF emitter location.

The use of TDOA for precision location on aircraft flying certain common missions has severe limitations. FIG. 1 provides scenarios that illustrate this. FIG. 1a shows a desirable engagement geometry in which two ground attack aircraft 100 and 101 five miles apart approach emitter 103. The aircraft are spaced close enough together to allow visual contact, which is operationally highly desirable. A TDOA methodology does not support this desirable geometry, as shown by Wegner, since TDOA requires three observers able to simultaneously detect the emitter. Also the TDOA location is most accurate when the three aircraft have the emitter at the center of an equilateral observer triangle, and performance can degrade rapidly for other geometries. For example, if the aircraft are only able to approach the emitter from one direction, which is a common constraint, then obtaining a location accuracy on the order of 125 m circular error probable (CEP) requires the addition of a second flight of two aircraft 104 and 105, as shown in FIG. 1b.

These additional aircraft must be spaced sufficiently far from the initial pair to allow geometry to dominate system errors when intersecting TDOA hyperbola to locate the emitter. But with the 30 nm spacing between observers required to approach a 125 m CEP, the simultaneous detection of the same emitter RF pulse becomes increasingly more difficult to achieve. One aircraft may detect the emitter's mainbeam, while the remaining aircraft fail to simultaneously detect the emitter's sidelobe. And even if multiplatform detection is successful, the problem of data correlation remains. With widely spaced platforms it may be difficult to associate pulses with the same emitter, let alone guarantee the same pulse is used by all observers to measure TOA.

Also, since the emitter location is often initially not even approximately known, it is difficult to optimize placement of the observers. But performance is very sensitive to observer-emitter relative bearings. The following example illustrates this. TDOA performance was derived for both the head-on approach with the emitter at 103, and for the 45° approach shown there with the emitter at 106. The system errors assumed in generating performance included the following: time-of-arrival (TOA) variation due to pulse rise time, video bandwidth, and signal strength effects, where the strength variation arises from signal propagation length differences and receiver measurement degradation; aircraft location errors due to GPS measurement uncertainty; and lack of time synchronization caused by phase error between the reference clock on each aircraft. The system errors assumed produced a TOA error at each observer with a one sigma statistical variation of 34.7 nsec. Geometry-induced errors, or GDOP (geometrical dilution of precision) arise from the shallowness of the angles at which the TDOA-generated hyperbola intercept at the emitter, and the GDOP degradation limits the system error that can be tolerated in any given observer-emitter geometry.

For the head-on geometry of FIG. 1b, the interaction of this TOA error and the GDOP error produced a CEP of 165 m. But for the 45° geometry of FIG. 1b, i.e., with the emitter at 106 rather than 103, the error is over 257 m. This sensitivity of performance to changes in emitter-observer geometry clearly represents an important tactical problem in the use of TDOA to precisely locate emitters.

In contrast to TDOA, multiplatform emitter location with circles-of-position uses only differential measurements made by single observers rather than measurements between observers. Hence no simultaneous multiplatform coordination is required to generate the LOP. But the bearing difference measurements must be made with sufficient accuracy to produce precise enough COPs to locate the emitter to the required circular error probable. The errors can be reduced by increasing the bearing spread 510 in FIG. 5, which means increasing the flight path length 501 and hence total time over which the difference is formed. But this is not a robust approach since the emitter may be on only very briefly.

The applicant's U.S. Pat. No. 5,526,001 presented a method to generate the circles employing phase difference measurements from an uncalibrated two antenna long baseline interferometer (LBI). When measuring 510, β, with an interferometer, measurement precision is proportional to interferometer baseline length. Hence use of the LBI, which can have a baseline of several hundred inches, provides resolution that makes it practical in many operational situations to rapidly measure bearing differences against higher frequency emitters and hence do multiplatform geolocation in tactically important situations. But there are still critical limitations, as will be seen.

Since the circles are generated from the LBI phase measurements, they are called phase-circles. FIG. 2 illustrates the use of phase-circles to locate the emitter in the scenario introduced by FIG. 1a. The aircraft 100 and 101 fly short baselegs 205 and 206 for 8 seconds to generate bearing changes at the emitter, and associate the circular lines of position 200 and 201 with these bearing changes. In order to produce the performance shown by 400 in FIG. 4, the bearing change was measured by a 240 inch LBI. The emitter is located by the intersection of the two COP at point 202. The accuracy of the phase-circles is not affected by emitter pulse characteristics, such as pulse width or rise time, as are the TOA measurements. However the accuracy is a function of emitter frequency. This dependence arises from the use of the phase interferometer to make the bearing change measurements. When the emitter is practicing ECCM by not staying on for any appreciable length of time, the accuracy of the bearing change measurement at lower frequencies cannot be reliably improved by flying a longer baseleg then the 8 second leg assumed in generating the FIG. 4 results.

Hence the low frequency emitter location accuracy of the phase-circle method is not satisfactory in some important cases, and in particular for the scenario shown in FIG. 1a. As the FIG. 4 performance curve 400 demonstrates, the goal of 125 m CEP can only be achieved at 6 GHz and above for the 8 second measurement interval allowed.

Insert 207 in FIG. 2 indicates the problem. The GDOP for the phase-circles is severe in the FIG. 1a scenario due to the shallow intersection angle of the COP. The lines 204 and 205 give the COP perturbation due to 3° 1s phase measurement errors. These measurement errors are due to navigation system (NAV) attitude errors in spatially locating the LBI baseline, antenna vibration induced errors, antenna phase mistrack bias, receiver calibration phase bias, thermal noise and quantization errors. It is extremely difficult to reduce the errors below the ±30° assumed. These errors produce the 1s emitter location region 206. The area of this region is clearly very sensitive to COP perturbations. A small increase in COP uncertainty due to phase measurement error, e.g. downward shift in COP inner bound 203, induces a substantial degradation to emitter location accuracy.

This invention increases the system error that can be tolerated for a given observer-emitter geometry. It also decreases the sensitivity of location accuracy to changes in that geometry. In particular it reduces the frequency limitation aspects of the phase-circle approach by linking it with TDOA. The link is done in a way that also largely alleviates the shortcomings in measuring multiplatform TDOA since the TDOA is measured between closely spaced observers., e.g. 100 and 102 in FIG. 1a, and only two observers are required.

SUMMARY OF INVENTION

Hence one object of the invention is to combine TDOA measurements between two observers with phase difference measurements made on one or more aircraft to improve the low frequency performance of the phase-circle approach. In doing this it exploits the fact that the accuracy in forming the TDOA hyperbola is not frequency dependent, that the accuracy in generating the phase circles is not signal pulse width or rise time dependent, and that the intersection of the hyperbola and phase circles may occur at a steep enough angle to significantly reduce GDOP. FIG. 3 illustrates the GDOP reduction obtained using the method in the FIG. 2a scenario, while curve 401 in FIG. 4 indicates the improvement in performance obtained.

Still another object of the invention is to provide a more reliable way to make TDOA measurements by allowing the observers to be closely spaced, and also to reduce the impact of TOA measurement jitter on geolocation accuracy. TDOA measurements with the aircraft closely spaced are more robust because both platforms are likely to detect the same emitter antenna beam, and cross-platform same pulse association is much easier. The impact of TOA measurement errors is reduced because the TDOA GDOP portion of the location error is reduced, allowing an increase in the system error component.

Yet another object of the invention is to improve the emitter line-of-position intersection geometry, i.e., reduce the geometrical dilution of precision that occurs when measurements are made with the observers close together. It does this partly by exploiting the fact that by using the TDOA measurements made by at least two observers and phase change measurements made by at least one observer, the measurement errors are uncorrelated for the various LOP. These LOPs are ideally generated by two aircraft producing three emitter lines-of-position: two from phase circles and one from the TDOA hyperbola.

The interaction of the LOP errors is shown graphically in insert 301 in FIG. 3 for the important closely-spaced, two-observer case of FIG. 1a. The hyperbolic LOP 300 greatly reduces the sensitivity of the location error region 302 to perturbations in the phase-circles over the phase-circle only case shown in 207, FIG. 2. The minimum and maximum 1s excursions in the TDOA LOP, 303 and 304, can be larger than for TDOA-only location without significantly impacting performance.

The equations for the LOP errors for phase-circles and TDOA hyperbolas are important in understanding the interaction of these errors in general. The LOP in both TDOA and phase-circle generation relates a measured quantity q (i.e. resolved phase change or TDOA) to emitter coordinates. For such a relation, Chestnut, "Emitter Location Accuracy Using TDOA and Differential Doppler" (*IEEE Transactions on Aerospace and Electronic Systems*, AES-18, No.2, 1981), shows that the standard deviation of the location error, $S_{LOP_q}$, for the line of constant q on the surface of the earth, factors into the form $$\sigma_{LOP_q} = GM \qquad 1$$

Here M is the factor depending only on measurement errors, while G represents the error due only to geometry. As will be seen, this invention exploits this factorization of the error.

Equation 1, neglecting NAV errors, for the phase-circle is, $$\sigma_{LOP_c} = \frac{r_1 r_2}{B} \frac{\lambda \sigma_{ph}}{2\pi d} \left( \frac{1}{\cos(\phi_1)^2} + \frac{1}{\cos(\phi_2)^2} \right)^{\frac{1}{2}} \vec{i}_1 \qquad 2$$

while for the constant TDOA LOP it is $$\sigma_{LOP_h} = \csc\left(\frac{1}{2}\theta\right) \sigma_{TDOA} \vec{i}_2 \qquad 3$$

In Equation 1, d is the LBI baseline length, while l is the signal's wavelength and $s_{ph}$ the receiver phase measurement one sigma statistical error. The remaining variables are geometrical in nature and are defined in FIG. 5. Because the LOP is the unique one on which an emitter must lie if it generates the constant phase change measured, the error perturbation due to a perturbation in this measured phase change has a direction normal to the circle. The directional nature of the error is indicted by 504 $\vec{i}_1$, which is oriented at the angle given by the first bearing 502 and last bearing 503 difference, i.e. at angle $f_2 - f_1$ relative to cord 501 B.

In Equation 2, $s_{TDOA}$, obtained from the individual receiver TOA measurement errors, is the only system parameter. The error direction 505 $\vec{i}_2$ is normal to the line bisecting 506 the angle q subtended at the emitter by the two aircraft 500 and 507.

In forming the circular and hyperbolic LOP it is desirable to obtain curves such that $\vec{i}_1$ and $\vec{i}_2$ are as orthogonal as possible to reduce the GDOP, i.e the G factor in Equation 1. This is controlled in generating the phase-circles by the ranges $r_1$ 508 and $r_2$ 509 to the emitter, and the distance B 501 flown to produce the bearing change. In generating the TDOA measurements the error normal vector is controlled by the emitter bearing angle 506 between the aircraft. Thus the direction of the error vectors 504 and 505 is based on two separate sets of largely independent geometrical variables. This provides a great deal of flexibility in reducing CrDOP compared with the use of multiple TDOA hyperbola or phase-circles alone. The reduction of G in Equation 1 reduces the impact of system measurement errors in M.

FIG. 6 shows how this flexibility is utilized. FIG. 6a gives a top level block diagram of the system. A key aspect of this invention is that it measures not only pulse TOA 610 and LBI phase 609, but also the error variances 601 and 602 of these measurements. Thus an estimate of the factor M in Equation 1 is obtained.

FIG. 6b, which gives the logic flow associated with the processing in FIG. 6a, indicates how G is found. SBI measurements from two observers can be used to obtain a preliminary coarse location to the emitter in 618 and 619. This provides all the initial information required to estimate G for both the phase circles and hyperbolic TDOA LOP. Having both the G and M components of the LOP error allows 620 the observers to be moved into a position to produce the most orthogonal error set possible for precision location. This optimization is carried out by utilizing the relations in Equation 2 and Equation 3.

For instances in which it is desirable or necessary to determine the geolocation of an emitter without the use of an SBI, one may utiltize applicant's method and system disclosed in the copending application entitled, "MULTIPLAT-FORM AMBIGUOUS PHASE CIRCLE AND TDOA PRECISION EMITTER LOCATION," filed on even date herewith and assigned to present assignee, the entire disclosure of which is hereby incorporated by reference in this specification.

The real-time estimation 603 of the measurement errors 601 and 602 (FIG. 6a) required by these equations is made utilizing signal-to-noise ratio (SNR) measurements 604 and 605. Process 606, Signal Detection and Parameter Measurement, includes the receivers that generate ambiguous phase change between two widely spaced antennas 607 and 608. Even if preliminary SBI coarse location is not used to optimize observer-emitter geometry before undertaking precision location (and no such optimization was done in generating the performance result 401 shown in FIG. 4), the statistical error measures are still used in the location estimator to generate emitter location by combining the available sets of phase-circles and TDOA hyperbola in Location Process 611.

Also, as indicated in FIG. 6b, SBI measurements are always used to resolve 621 the ambiguous LBI measurements made in 620 regardless of whether preliminary coarse location is generated 619. As noted in the applicant's U.S. Pat. No. 5,343,212, errors with a constant bias from one receiver dwell to the next cancel in forming the LBI phase difference measurement associated with the COP in 624. But some errors are constant during a receiver dwell, while varying from one dwell to the next. The most dominant of these errors is due to emitter polarization change between dwells interacting with the antennas 607 (FIG. 6a) and 608 polarization response. This error is calibrated out in 623 (FIG. 6b) before the resolved LBI phase change is used to generate the COP by measuring the signal polarization.

Using well established optimal estimation procedures, Location Processor 611 generates results that take the nature of a phase circle-only algorithm 612, combined hyperbola and phase-circle geolocation estimator 613, or TDOA-only estimator 614 based on the relative weights 616 and measurements available. For example, when only two observers are making measurements, or the emitter has a CW mode only, 614, the intersection of two TDOA LOP, will not occur. Task signal 615 is sent by process 611 whenever a phase-circle has been generated to coordinate a TOA measurement through data link 616 and force operation in mode 613, if possible.

The measurement of TDOA in FIG. 6b 627 can be done between two stationary observers, or between observers also generating the phase-circles, as was done in the scenario shown in FIG. 3. If SBI coarse location was found, a check on the pulse used to find the DTOA in 629 is done in 628.

Although the invention could be implemented using separate phase and TOA measurement systems, the preferred implementation is a single system that can obtain all the required parameters. The practical realization of such a single system implementation of the invention is described next.

BRIEF DESCRIPTION OF THE DRAWINGS

FIG. 3 shows how the method of this invention improves the two aircraft FIG. 1a scenario performance by utilizing pulse TDOA measured between the observers.

DETAILED DESCRIPTION OF THE PREFERRED EMBODIMENTS

Figure 5:
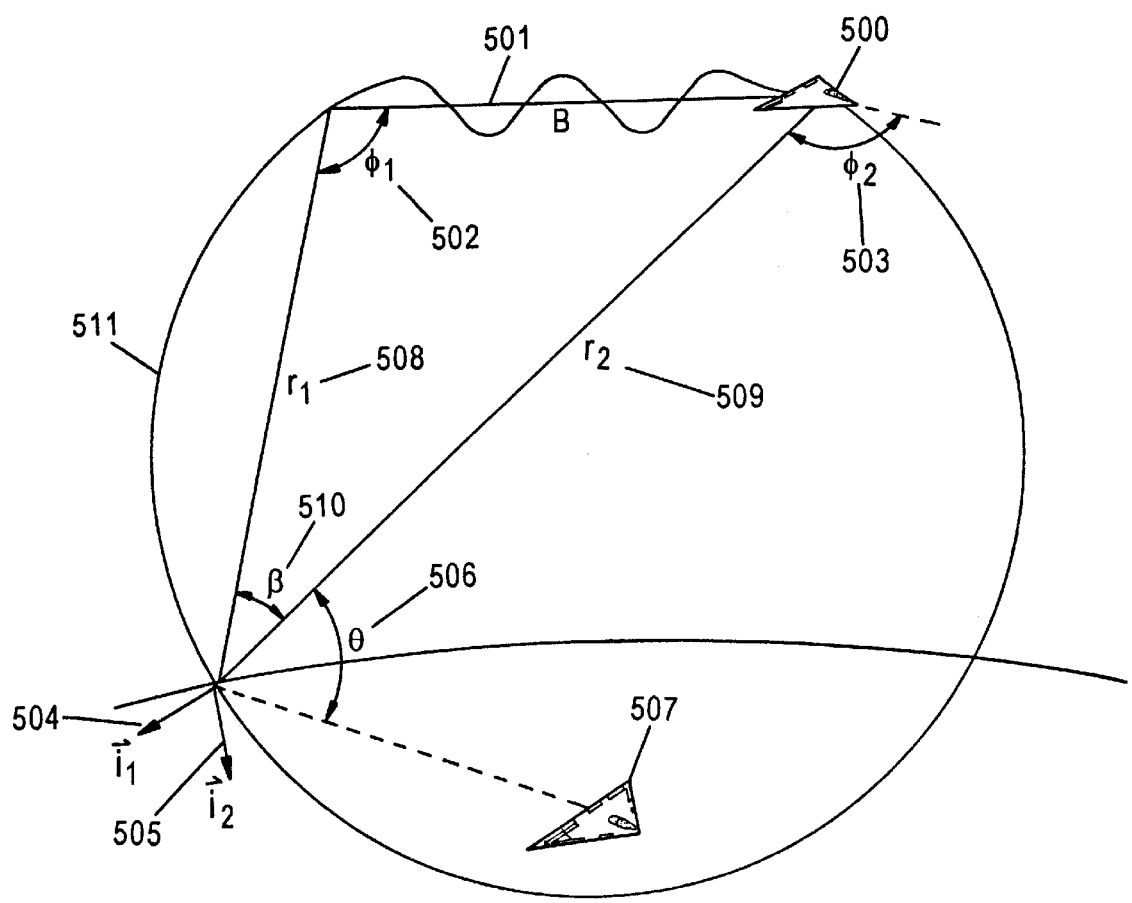
FIG. 5 illustrates the key geometrical variables for the phase-circle combined TDOA approach, and shows the vector relationship of LOP perturbation due to system errors. Since the phase measurement errors and TOA measurement errors are statistically independent, the geometric dependence of the error vector relationship can be exploited to obtain nearly orthogonal location error contributions.
Figure 7:
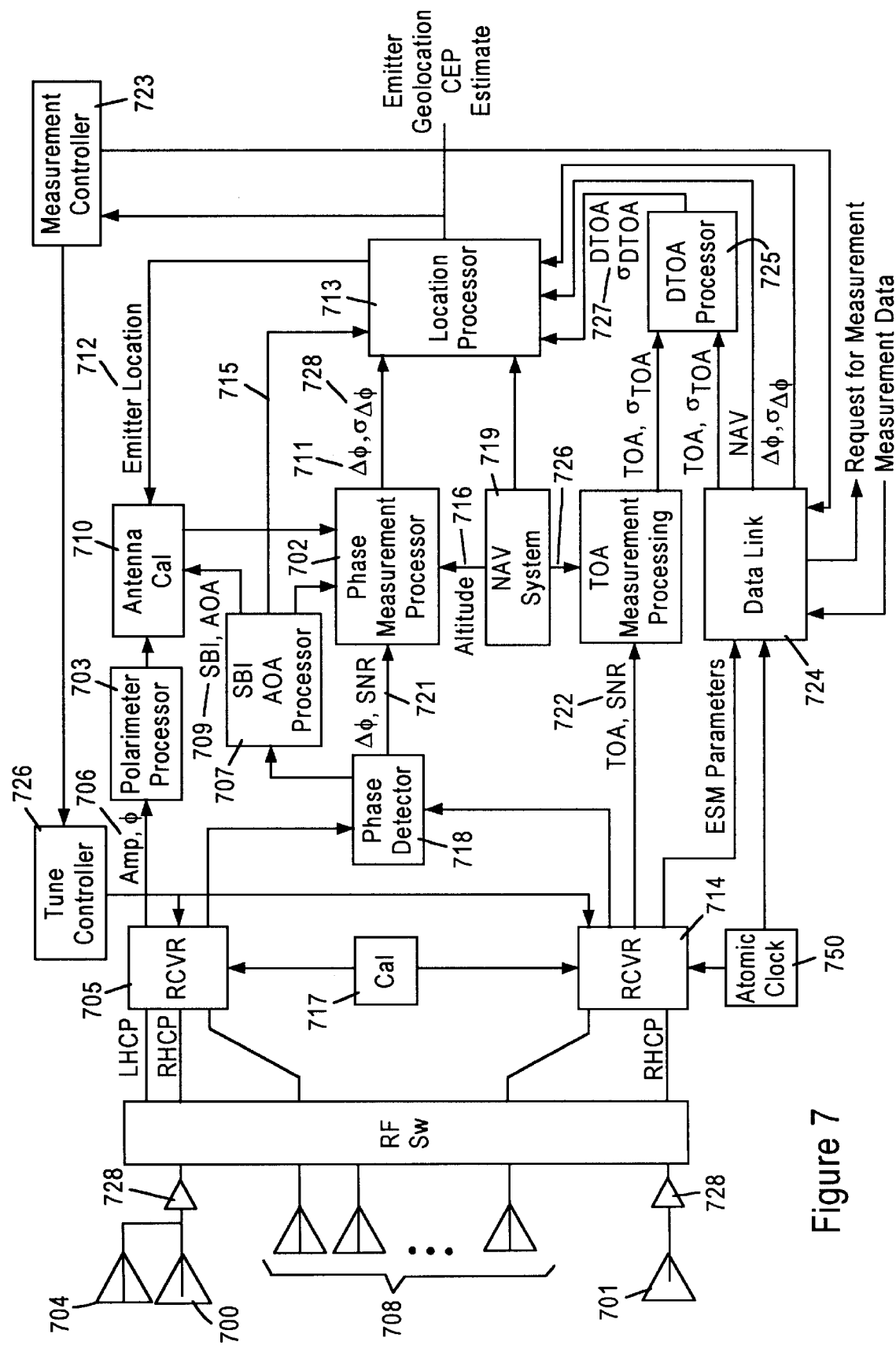
FIG. 7 is the preferred embodiment of the current invention.

FIG. 7 shows the measurement system that would be located on each observing platform required to make both TDOA and LBI differential phase measurements. As indicated by Equation 2 and FIG. 5, the accuracy of the phase-circle LOP is proportional to the bearing change measured by the observer, and inversely proportional to the emitter frequency and phase measurement error. Since the emitter may only be transmitting for a very short time, the total bearing change may be quite small. Therefore it is necessary to reduce the phase measurement error as much as possible in making phase difference measurements with the LBI via antennas 700 and 701. As an example of the antenna placement, antenna 700 may be the existing radar warning (RW) antenna, while 701 represents an antenna in the SBI array installed in a removable door located on the fuselage. The thermal noise on the phase differences measured during a dwell is reduced by averaging in the Phase Measurement Processor 702. This leaves errors that are constant during a dwell, but change from dwell to dwell. Such errors cannot be reduced by averaging in a single dwell, and will not cancel when forming the phase difference between dwells. These errors must be reduced by system calibration.

The dominant dwell-to-dwell variable phase measurement error is caused by the change in emitter signal polarization when the receiver detects mainbeam, side and backlobes on different dwells. Reducing this error requires simultaneously measuring signal phase and amplitude by the collocated antennas 700, a right circularly polarized antenna, and 704, a left circularly polarized antenna. Model 201600-2 dual circular polarization cavity back sinuous types, made by Tecom Industries Inc., allow the simultaneous measurements of right-hand circular polarization (RHCP) and left-hand circular polarization (LHCP) outputs, and is typical of the type antennas that are used for this purpose. The amplitude and phase are measured by a receiver 705 assumed to have the performance of the Litton Industries Amecom Division's LR-100 ESM Receiver, that is an amplitude measurement capability to 1.5 dB, and phase resolution accuracy to better than 3 electrical degrees. Emitter polarization is extracted from the phase and amplitude measurements using well established algorithms in the Polarimeter Processor 703. The emitter polarization and signal AOA 709 obtained from the fully resolved short baseline interferometer 708 are used to determine the phase correction required from calibration data in 710. This is an iterative process in which emitter location estimates 712 from the Location Processor 713 are fed back, as location is refined, to the Antenna Calibration Process 710 in order to obtain emitter direction-of-arrival (DOA) rather than just AOA. The adjusted phases 711 are then used to rederive the phase-circle LOP in the location processor 713. The required calibration data stored in 710 are obtained using a full-scale mockup of the actual antenna installation, including radomes. The calibration data encompass the entire frequency band and azimuth-elevation field-of-view.

The high resolution but ambiguous phase measurements made between antennas 700 and 701 by receivers 705 and 714 have the ambiguity differentially resolved by the SBI 708 in the phase measurement processor 702. The method used to do this is that described by Kaplan in U.S. Pat. No. 4,734,702, and requires the aircraft attitude 716 provided by the NAV system 719. Since the antennas are located far from the receivers, signal loss due to the long cable runs is overcome by an RF preamplifier 728 adjacent to the LBI antenna not associated with the SBI array. Neither the cable runs nor the antennas are included in the calibration loop. This is an important element in the single observer LBI approach that is exploited here: no phase calibration is required to compensate for the extremely long baseline being used. The neglected phase errors are dwell-to-dwell constant for fixed frequency emitters.

Thus, since bearing difference alone is used to generate the phase-circles, the measurement strategy is that given in the applicant's U.S. Pat. No. 5,526,001, i.e., to map all phase mistrack errors between receiver channels to a constant bias that doesn't vary from dwell to dwell. The phase mistrack in the receivers 705 and 714 depends principally on emitter frequency, pulse amplitude and ambient temperature. Over the short times the phase measurements are made, temperature change is not a problem. Injecting a calibration signal from 717 near the current operating point, i.e. near the frequency and amplitude of the received signal, can provide a nearly constant dwell-to-dwell phase mistrack bias if the emitter does not have significant intrapulse modulation. The variable bias component of the phase mistrack error is then due to interpolation inaccuracies. Real-time calibration using process 717 also assures the SNR estimates 721 and 722 will be accurate.

Phase Detector 718 performance is critical to the success of the technique. The most important error introduced by the phase detector is phase measurement bias error, principally due to cell edge variations at the output of the quantizer. A seven-bit phase quantizer is used to control these errors.

Multiplatform DTOA measurement methods are well established. In this implementation, receiver 714 measures TOA with a resolution comparable to that of the Litton Industries Applied Technology Division's Advanced Digital Receiver, that is a resolution of 0.625 nsec. The clock used in making the TOA measurement has the capability of the Westinghouse low power cesium cell miniature atomic clock, that is a one-day stability of $10^{-11}$. This clock must be synchronized with a similar clock on the second platform. The command to make the TOA measurement is generated by the controller 723 and sent to the second platform through the data link 724. The Measurement Controller also accepts commands from other platforms to make a measurement during a future time interval, and commands the Tune Controller 726 accordingly.

Figure 1A:
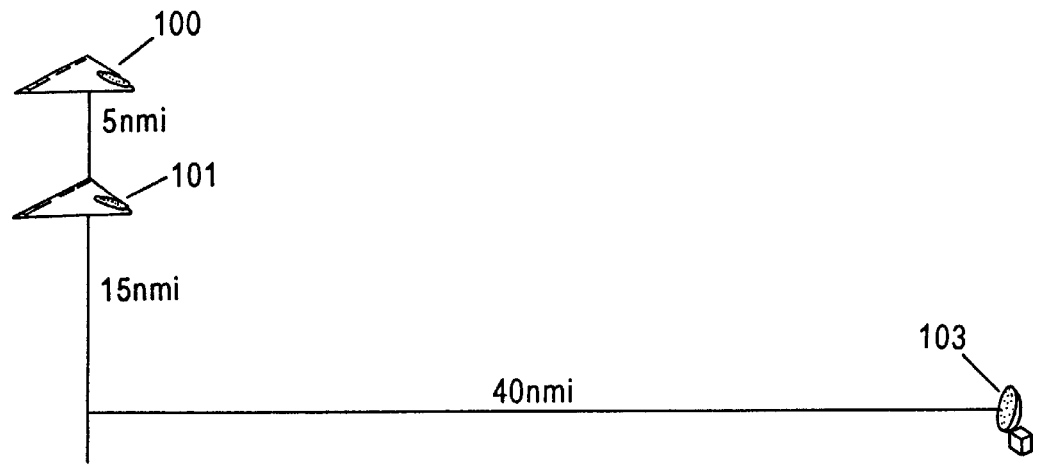
FIG. 1a shows a frequently occurring location geometry which demonstrates the limitations of a TDOA-only location methodology.
Figure 1B:
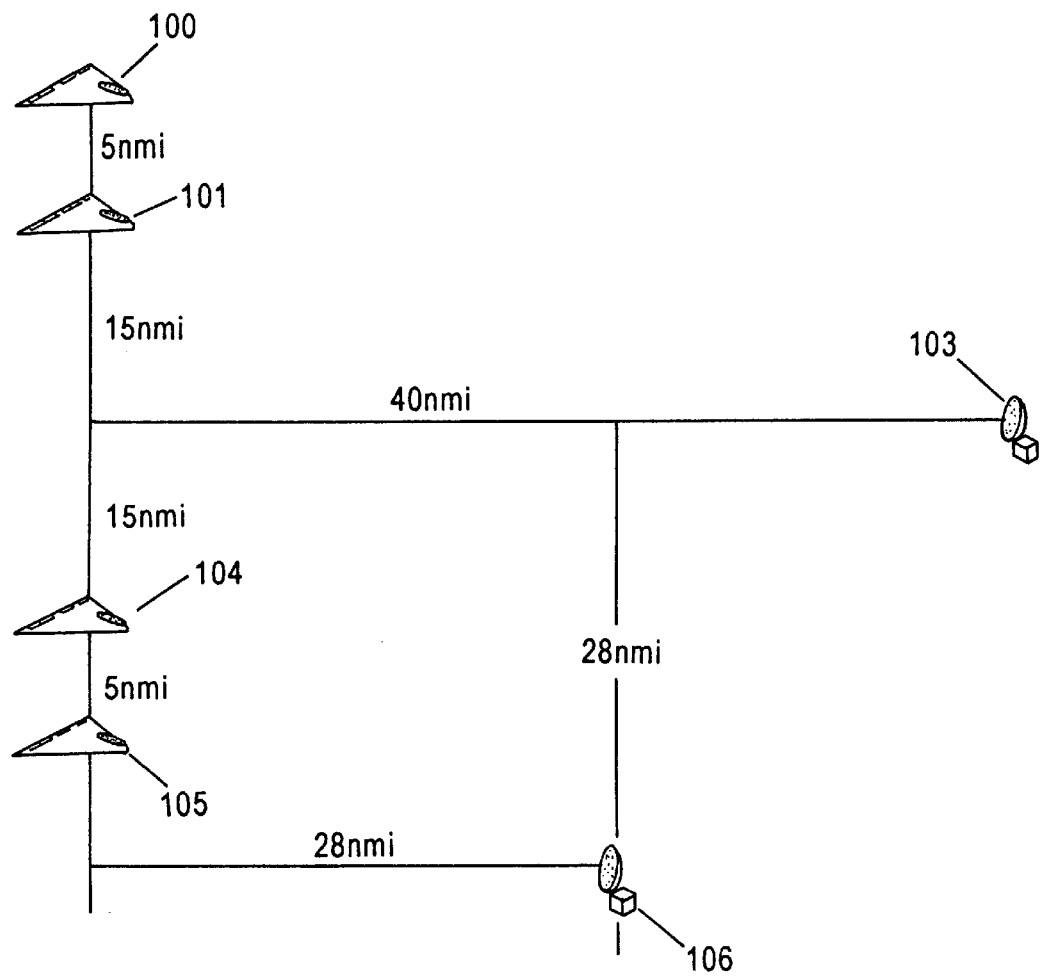
FIG. 1b shows a modification of the scenario in FIG. 1a in which a second flight of two aircraft is added to allow TDOA emitter location. Two emitter positions are shown, with the emitter in both cases located 40 nmi from the midway point between the two flights. The case with the emitter 28 nmi off the center axis produces errors over 55% greater than the case with the emitter located on the axis.
Figure 2A:
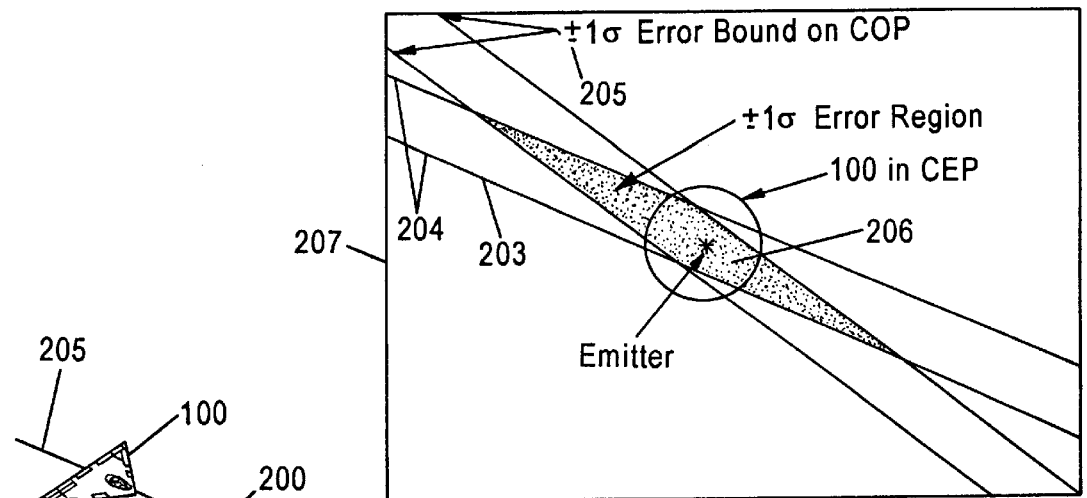
FIG. 2 shows the location of the emitter by the prior art phase-circle method for the FIG. 1a scenario. Only two observers are required, at higher emitter frequencies, to obtain the location CEP for which TDOA required four observers. However, performance degrades rapidly with emitter frequency.
Figure 2:
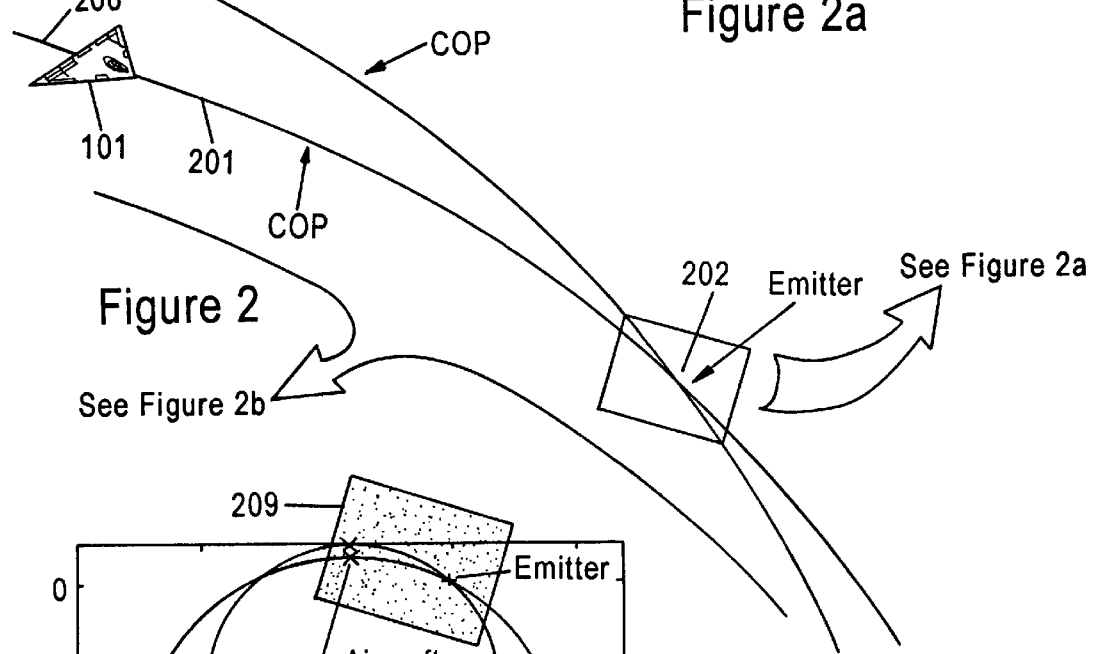
Figure 2B:
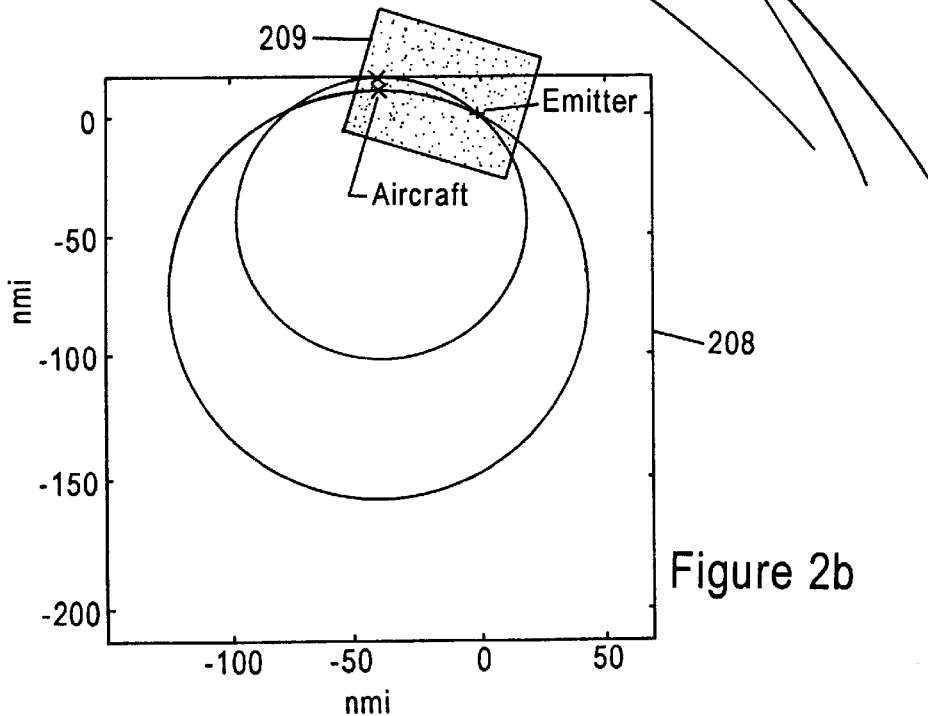
Figure 4A:
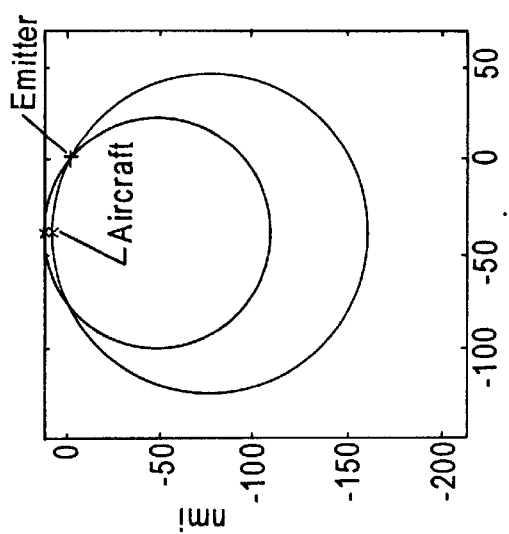
FIG. 4 contrasts the performance versus frequency for the scenario in FIG. 1a with a fixed ranging time of 8 seconds. One hundred twenty-five meters CEP is the goal, and this is attained only at emitter frequencies above 6 GHz for the prior phase circle approach, but down to 2 GHz when the method of this invention is used.
Figure 4B:
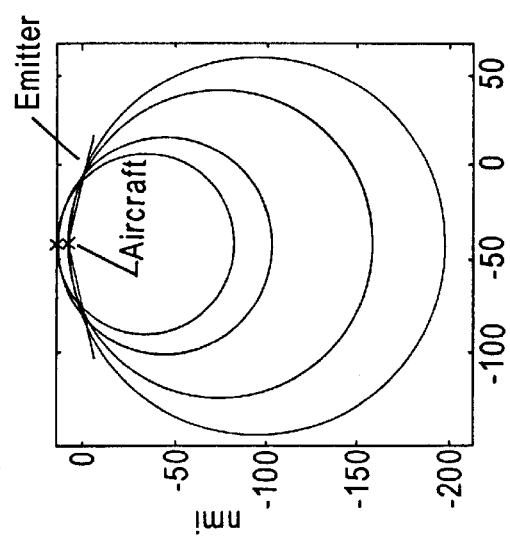
Figure 4:
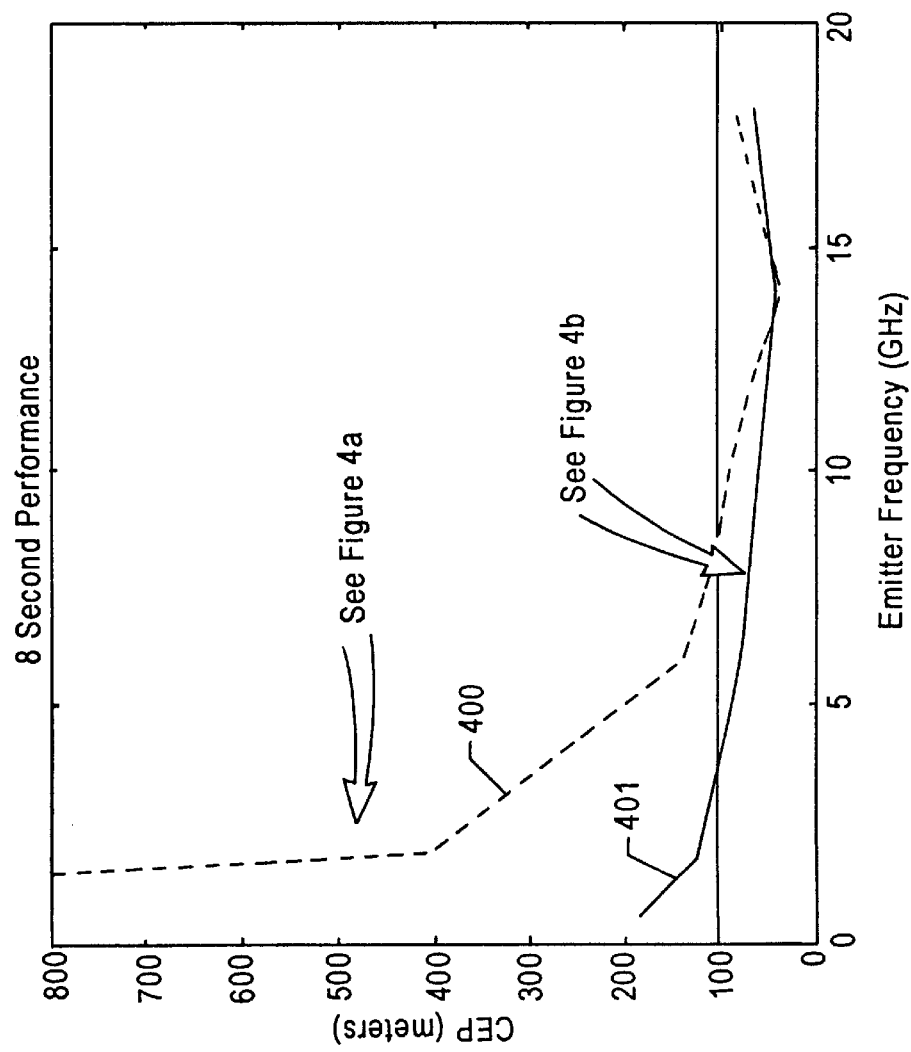
Figure 6A:
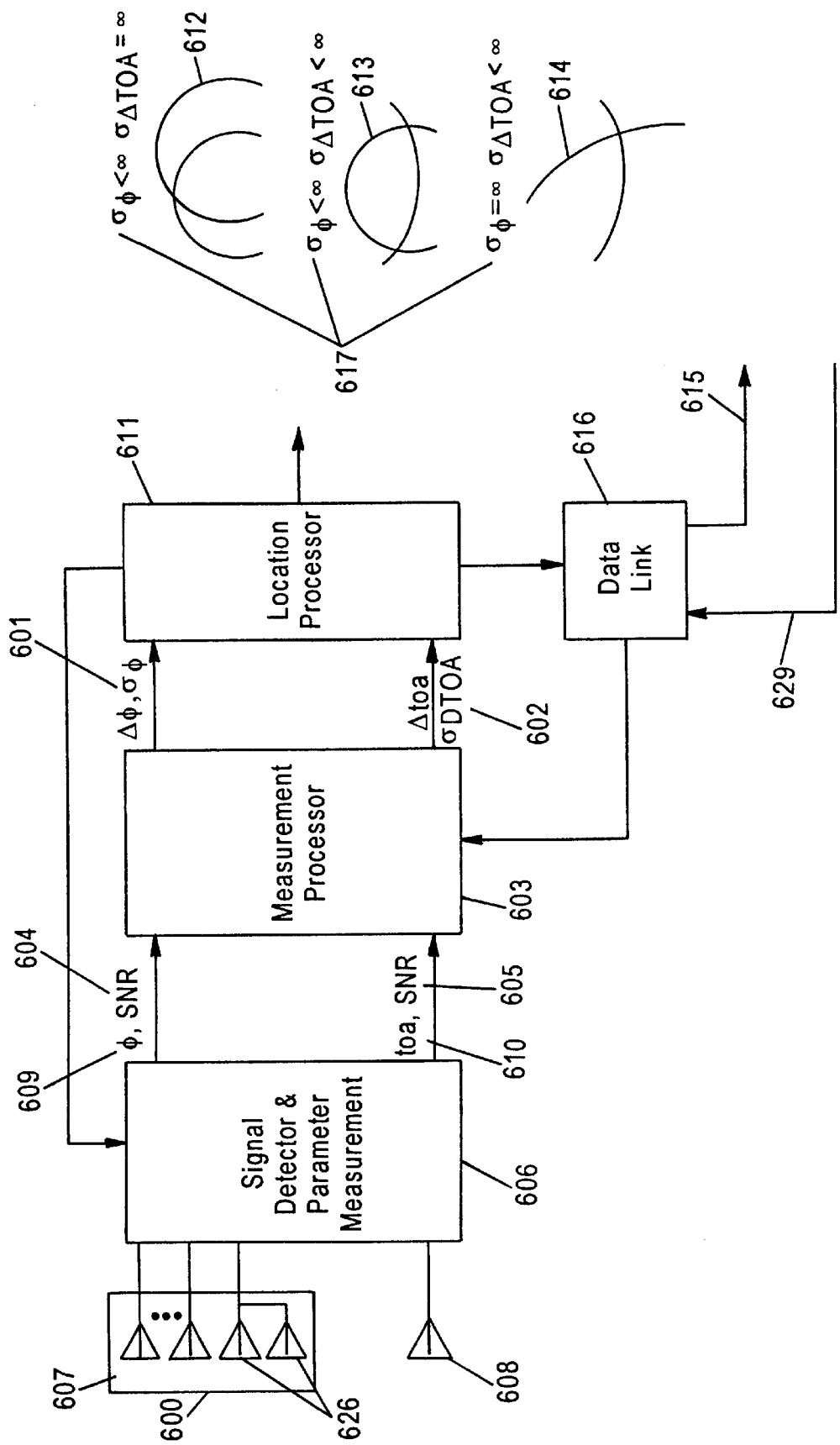
FIG. 6a is a top level system representation of the current invention.
Figure 6B:
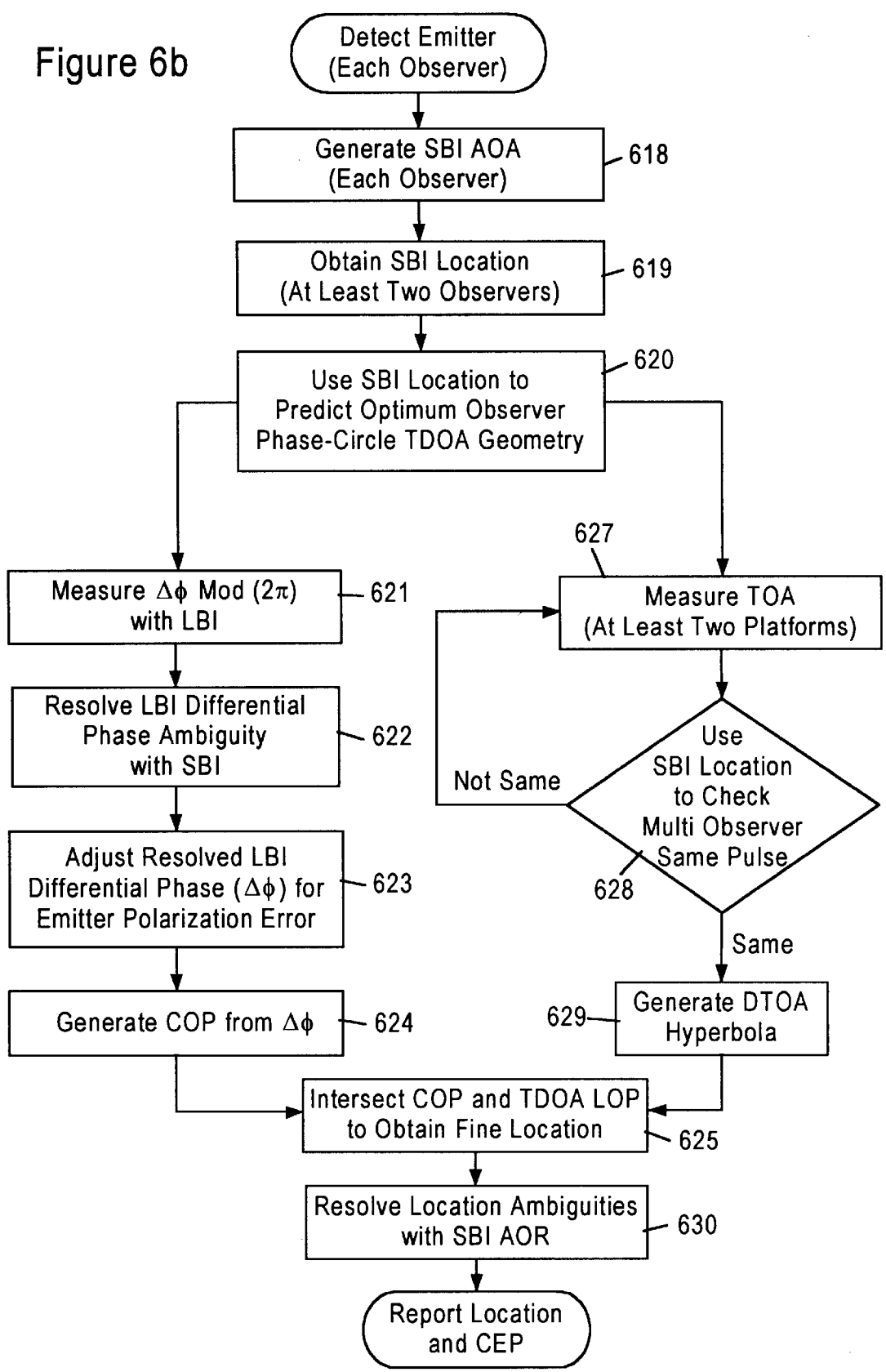
FIG. 6b shows the steps in precision emitter location according to the method of the current invention. Not all steps need be carried out to obtain greatly improved performance over TDOA-only or phase-only location. For example, in obtaining the improved performance indicated by curve 401 in FIG. 400, the SBI measurements were only used to resolve the LBI, and not to provide initial coarse location.

The TOA measurements made on the same pulse are differenced in 725, and input to the Location Processor 713. The location processor combines the DTOA measurements and error variance estimate 727 with the adjusted phase difference 711 and error variance estimate 728 to produce location estimates, which partake the nature of DTOA-only, phase-circle only, or combined depending on the correctly scaled relative weights of the error variances (as shown in FIG. 6a). It is most desirable to always obtain the TDOA and phase circle intersection indicated by 613. For example, the FIG. 4 performance curve 401 shows the improvement the combined approach gives over the use of phase-circles only. The addition of the TDOA LOP greatly extends the low frequency region providing acceptable performance compared to the phase-circle only operation (curve 400, FIG. 4) indicated by 612.

What is claimed is:

1. A method for determining the geolocation of a stationary emitter, the method comprising the steps of:

measuring using a long baseline interferometer (LBI) the ambiguous electrical phase change of the emitter signal corresponding to the change in signal angle of arrival (AOA) due to observer movement with respect to the emitter;

resolving the ambiguous electrical phase change to determine the electrical phase measurement from the ambiguous set that is uniquely associated with the AOA or bearing change;

utilizing the electrical phase measurement to calculate the bearing change of the observer;

creating circles of position (COPs) along which the emitter must lie based on the bearing change;

calculating the time difference of arrival (TDOA) of the emitter RF signal received by at least two observers of known position;

generating a hyperbola along which the emitter must lie based on the TDOA calculations from the at least two observers; and determining the intersection of the COPs and hyperbola to arrive at a distinct point of location.

2. The method of claim 1, further comprising the steps of:

using short baseline interferometers (SBIs) positioned on each of at least two observers to measure the angle of arrival (AOA) of the signal from the emitter;

obtaining preliminary coarse location to the emitter based on the intersection of the AOA measurements from the at least two observers; and computing an optimum position for the at least two observers based on phase circle and TDOA geometry from the preliminary coarse location.

3. The method of claim 1, said creating step further comprising the steps of:

resolving the LBI electrical phase change ambiguity by determining AOA at both the start and finish times of the LBI electrical phase change measurement using at least one short baseline interferometer (SBI);

measuring emitter polarization at both the start and finish times of the LBI electrical phase change measurement;

predicting the emitter polarization error present in the LBI electrical phase difference measurement based on the emitter polarization measurements and SBI AOA measurements; and adjusting the COPs based on the predicted emitter polarization error.

4. The method of claim 1, said generating step further comprising utilizing location of the emitter by at least one SBI to verify that each of the at least two observers is measuring an identical pulse of the emitter RF signal.

5. The method of claim 1, wherein said measuring step and said calculating step are performed using the same one of the at least two observers.

6. The method of claim 1, wherein said calculating step is performed by two stationary observers, or one moving and one stationary observer.

7. A method for determining using a first moving observer and a second observer, the geolocation of a stationary emitter, the method comprising the steps of:

measuring, using a long baseline interferometer (LBI), the ambiguous electrical phase change caused by the bearing change between successive dwell intervals of the first observer with respect to the emitter;

taking phase measurements of the emitter signal over the successive dwell intervals using a short baseline interferometer (SBI);

resolving the differential phase ambiguity present in the LBI phase change measurements by comparison to the unambiguous phase measurements taken by the SBI;

recording the position of the first observer and the spatial location of the LBI at each dwell interval;

performing pulse time-of-arrival (TOA) measurements at the first and second observers during predetermined clock intervals;

forming time-difference-of-arrival (TDOA) measurements using the TOA measurements of identical pulses of the emitter signal;

generating circular lines of position (LOPs) and hyperbolic LOPs, the circular lines of position being generated from the bearing change measurements of the LBI resolved by the SBI phase measurements, and the hyperbolic LOPs being generated from the TDOA measurements; and determining the intersection point of the circular and hyperbolic LOPs to arrive at a distinct point of location of the emitter.

8. The method of claim 7, wherein said generating step is executed prior to said performing step, and the second observer is in motion.

9. The method of claim 8, wherein the circular LOPs intersect to provide two possible emitter locations, the correct location being determined using the unambiguous phase measurements taken by the SBI; and the geolocation estimate provided by the intersected COP's is then used to predict the optimum observer positions for performing a TOA measurement resulting in the most orthogonal COP and TDOA LOP intersection.

10. The method of claim 9, further comprising the step of verifying the TDOA measurement using the geolocation estimate.

11. The method of claim 10, said verifying step comprising the step of checking that each of the at least two observers is measuring an identical pulse of the emitter RF signal, said checking step comprising:

predicting a time window within which the pulses received by the second observer and subsequent observers must lie, wherein the time window is less than the pulse repetition interval of the emitter signal, and is offset in time for each of the second and subsequent observers with respect to the first observer based on the predicted distance of each observer from the emitter location estimated by the intersecting COPs.

12. The method of claim 7, wherein the successive dwell intervals are separated by between one-half second and four seconds.

13. The method of claim 7, wherein said measuring step comprises employing phase detection circuitry designed so that, for the AOA derived from said phase measurement, the AOA measurement error is accurately characterized by the RF carrier frequency and signal-to-noise ratio (SNR) of the emitter signal.

14. The method of claim 7, wherein the circuitry for measuring said TOA is such that the TOA measurement error is accurately characterized by the signal pulse width, pulse rise time, and signal-to-noise ratio (SNR).

15. The method of claim 7, wherein said recording step comprises the step of utilizing a navigation system and association means.

16. The method of claim 7, further comprising the steps of:

extracting the parameters of emitter signal pulse width, pulse rise time, frequency, and amplitude; and applying the parameters in order to estimate the signal-to-noise ratios (SNRs) of the TOA measurements and of the bearing change measurements resolved by the phase measurements of the SBI; and compute the error variances in the TOA and phase measurements.

17. The method of claim 16, said determining step further comprises the steps of:

assessing the accuracy of the LOPs based on the error variances computed; and using the error variances, further adjusting the determined LOP intersection point to obtain the minimum-variance estimate or minimum-error estimate of emitter location, the minimum-variance estimate and minimum-error estimate constituting the estimate that statistically minimizes the difference between the predicted phase and predicted TOA measurement values based on the intersection point, and the actual measured phase and TOA.

* * * * *